United States Patent
Kato et al.

(10) Patent No.: US 9,909,652 B2
(45) Date of Patent: Mar. 6, 2018

(54) CHAIN TRANSMISSION DEVICE FOR DRIVING CAMSHAFTS

(71) Applicant: NTN CORPORATION, Osaka (JP)

(72) Inventors: Akio Kato, Shizuoka (JP); Takahiro Yamashita, Shizuoka (JP); Hisataka Hasegawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/114,597

(22) PCT Filed: Feb. 3, 2015

(86) PCT No.: PCT/JP2015/052945
§ 371 (c)(1),
(2) Date: Jul. 27, 2016

(87) PCT Pub. No.: WO2015/122317
PCT Pub. Date: Aug. 20, 2015

(65) Prior Publication Data
US 2016/0348764 A1    Dec. 1, 2016

(30) Foreign Application Priority Data

Feb. 17, 2014    (JP) .................................. 2014-027514

(51) Int. Cl.
*F16H 7/12* (2006.01)
*F16H 7/08* (2006.01)
(Continued)

(52) U.S. Cl.
CPC ................ *F16H 7/08* (2013.01); *F01L 1/022* (2013.01); *F01L 1/047* (2013.01); *F16H 7/06* (2013.01);
(Continued)

(58) Field of Classification Search
CPC ..... F16H 2007/0874; F16H 2007/0865; F16H 7/1281; F16C 13/006; F16C 2361/63
(Continued)

(56) References Cited

U.S. PATENT DOCUMENTS 68,625 A * 9/1867 Hawley .......................... 474/137
993,684 A * 5/1911 Vom Hoff ............. F16H 7/1281
474/131

(Continued)

FOREIGN PATENT DOCUMENTS

GB    2 276 929    10/1994
JP    9-236157     9/1997
(Continued)

OTHER PUBLICATIONS

Extended European Search Report dated Feb. 2, 2017 in corresponding European Application No. 15748587.1.
International Preliminary Report on Patentability and translation of Wriiten Opinion of the International Searching Authority dated Apr. 21, 2015 in corresponding International (PCT) Application No. PCT/JP2015/052945.

*Primary Examiner* — Henry Y Liu
(74) *Attorney, Agent, or Firm* — Wenderoth, Lind & Ponack, L.L.P.

(57) ABSTRACT

A chain transmission device for driving camshafts includes a chain including a loose side chain portion, and the chain is trained around the crank sprocket and the cam sprockets. A chain guide is mounted on the outer side of the loose side chain portion so as to be pivotable about one of the two end portions of the chain guide, and the chain guide has a plurality of rotatable rollers. An adjustment force is applied to the other of the two end portions of the chain guide by a chain tensioner such that the chain guide is biased toward the chain, so that the rollers of the chain guide can guide the chain by rolling. The winding angle of the portion of the
(Continued)

chain located on the outer periphery of the roller located closest to the crank sprocket is set to be 170 degrees or greater so as to reduce noise.

4 Claims, 4 Drawing Sheets

(51) Int. Cl.
    *F16H 7/18*            (2006.01)
    *F01L 1/02*            (2006.01)
    *F01L 1/047*          (2006.01)
    *F16H 7/06*            (2006.01)

(52) U.S. Cl.
    CPC ....... *F16H 7/18* (2013.01); *F16H 2007/0863* (2013.01); *F16H 2007/0872* (2013.01); *F16H 2007/0893* (2013.01); *F16H 2007/0897* (2013.01); *F16H 2007/185* (2013.01)

(58) Field of Classification Search
    USPC .................................................. 474/134, 135
    See application file for complete search history.

(56) References Cited

U.S. PATENT DOCUMENTS

| | | | | |
|---|---|---|---|---|
| 1,338,293 A * | 4/1920 | Fuchs | F16H 7/1254 | 474/134 |
| 1,480,078 A * | 1/1924 | Kegresse | B62D 55/108 | 180/9.62 |
| 1,499,920 A * | 7/1924 | Godden | B65G 13/11 | 193/37 |
| 1,579,245 A * | 4/1926 | Pennington | B62D 55/108 | 305/134 |
| 2,341,273 A * | 2/1944 | Helberg | B64C 13/30 | 474/109 |
| 2,349,281 A * | 5/1944 | Kendall | F16H 7/20 | 29/898.057 |
| 2,709,371 A * | 5/1955 | Hale | D05B 59/00 | 112/279 |
| 2,729,110 A * | 1/1956 | Killian | F16H 55/171 | 474/153 |
| 2,827,153 A * | 3/1958 | Olk | B65G 13/071 | 193/35 R |
| 2,892,206 A * | 6/1959 | Deibel | B60S 1/20 | 15/250.25 |
| 2,964,155 A * | 12/1960 | Flowers | B65G 13/11 | 193/35 R |
| 3,586,142 A * | 6/1971 | Inwood | B65G 1/023 | 193/35 R |
| 3,598,194 A * | 8/1971 | Wappler | B60K 17/36 | 180/6.2 |
| 3,888,217 A * | 6/1975 | Hisserich | F01L 1/024 | 123/90.15 |
| 3,930,323 A * | 1/1976 | Marold | E02F 3/6454 | 198/813 |
| 3,950,046 A * | 4/1976 | Lubbersmeyer | F16C 13/006 | 384/546 |
| 3,951,484 A * | 4/1976 | Bowman, Jr. | B65G 21/16 | 104/172.2 |
| 4,068,535 A * | 1/1978 | Sheets | F16H 7/1254 | 474/132 |
| 4,078,642 A * | 3/1978 | Payne | B65G 39/09 | 193/37 |
| 4,208,078 A * | 6/1980 | Miki | F16C 33/4635 | 29/898.061 |
| 4,213,523 A * | 7/1980 | Frost | B65G 39/09 | 193/37 |
| 4,416,647 A * | 11/1983 | White, Jr. | F16H 7/1281 | 474/134 |
| 4,416,648 A * | 11/1983 | Radocaj | F16H 7/1272 | 474/135 |
| 4,474,562 A * | 10/1984 | Heurich | F16H 7/1281 | 29/517 |
| 4,610,646 A * | 9/1986 | Walter | F16C 13/006 | 474/174 |
| 4,626,231 A * | 12/1986 | Nagano | F16D 1/076 | 29/465 |
| 4,723,516 A * | 2/1988 | Slagley | F01L 1/348 | 123/90.16 |
| 4,767,387 A * | 8/1988 | Matsuoka | B21D 53/261 | 474/168 |
| 4,892,508 A * | 1/1990 | Ryan | B61B 12/06 | 105/151 |
| 4,908,006 A * | 3/1990 | Burysek | D01H 1/241 | 474/117 |
| 4,913,689 A * | 4/1990 | Morishita | B21H 1/04 | 474/170 |
| 4,969,548 A * | 11/1990 | Kornylak | F16C 13/006 | 193/35 R |
| 4,981,116 A * | 1/1991 | Trinquard | F02B 67/06 | 123/90.31 |
| 5,244,439 A * | 9/1993 | Rogus | F16H 7/1263 | 474/136 |
| 5,441,354 A * | 8/1995 | Broder | B41J 29/02 | 226/181 |
| 5,441,458 A * | 8/1995 | Rogus | F16H 7/1245 | 198/826 |
| 5,848,846 A * | 12/1998 | Sugiyama | F16C 19/466 | 29/898.061 |
| 5,961,411 A * | 10/1999 | Tsutsumi | F16H 7/18 | 474/111 |
| 5,967,925 A * | 10/1999 | Meckstroth | F16H 55/38 | 474/168 |
| 6,041,490 A * | 3/2000 | Tabuchi | B21H 1/04 | 29/602.1 |
| 6,062,998 A * | 5/2000 | Kumakura | F16H 7/18 | 474/110 |
| 6,179,740 B1 * | 1/2001 | Walker | F16H 7/1254 | 474/134 |
| 6,189,639 B1 * | 2/2001 | Fuse | B62M 9/00 | 180/231 |
| 6,196,375 B1 * | 3/2001 | Cozza | B65G 21/2054 | 193/35 C |
| 6,220,211 B1 * | 4/2001 | Line | F01L 1/348 | 123/90.15 |
| 6,245,436 B1 * | 6/2001 | Boyle | C25D 11/026 | 428/472.2 |
| 6,254,503 B1 * | 7/2001 | Chiba | F16H 55/56 | 29/894 |
| 6,346,057 B1 * | 2/2002 | Edelmann | B65G 15/02 | 474/110 |
| 7,104,909 B2 * | 9/2006 | Asbeck | F16H 7/1218 | 474/112 |
| 7,419,447 B2 * | 9/2008 | Serkh | F16H 7/1218 | 474/117 |
| 7,780,556 B2 * | 8/2010 | Sakanaka | F16G 5/16 | 474/174 |
| 7,866,292 B2 * | 1/2011 | LaBere | F01L 1/02 | 123/90.15 |
| 7,909,717 B2 * | 3/2011 | Boussaguet | F16C 13/006 | 474/136 |
| 8,282,289 B2 * | 10/2012 | Oishi | F16C 33/541 | 384/564 |
| 8,684,895 B2 * | 4/2014 | Severing | C21D 5/00 | 492/1 |
| 2001/0053727 A1 * | 12/2001 | Nakashima | F16G 5/166 | 474/242 |
| 2003/0092521 A1 * | 5/2003 | Konno | F16H 7/18 | 474/111 |
| 2004/0002401 A1 * | 1/2004 | Iverson | F16H 7/1254 | 474/134 |
| 2004/0116224 A1 * | 6/2004 | Sakamoto | F16H 55/30 | 474/152 |
| 2005/0031240 A1 * | 2/2005 | Dodoro | F16C 19/163 | 384/494 |
| 2006/0153485 A1 * | 7/2006 | Maeda | F16C 19/44 | 384/569 |

(56) References Cited

U.S. PATENT DOCUMENTS

| | | | | |
|---|---|---|---|---|
| 2007/0026986 A1* | 2/2007 | Walker | ............... | F16H 7/1254 |
| | | | | 474/134 |
| 2007/0110348 A1* | 5/2007 | Obara | ............... | F16C 17/026 |
| | | | | 384/107 |
| 2008/0070731 A1* | 3/2008 | Vrsek | ............... | F01L 1/348 |
| | | | | 474/134 |
| 2010/0160102 A1* | 6/2010 | Haag | ............... | C23C 22/53 |
| | | | | 474/166 |
| 2011/0294612 A1* | 12/2011 | Kato | ............... | F16H 7/08 |
| | | | | 474/91 |
| 2013/0324339 A1* | 12/2013 | Kato | ............... | F16H 7/18 |
| | | | | 474/137 |
| 2013/0331211 A1* | 12/2013 | Kato | ............... | F16H 7/18 |
| | | | | 474/101 |
| 2014/0274512 A1* | 9/2014 | Oishi | ............... | F16H 7/18 |
| | | | | 474/139 |
| 2014/0378254 A1* | 12/2014 | Kato | ............... | F16C 13/006 |
| | | | | 474/134 |
| 2015/0323047 A1* | 11/2015 | Kato | ............... | F16H 7/08 |
| | | | | 474/91 |

FOREIGN PATENT DOCUMENTS

| | | |
|---|---|---|
| JP | 2001-187948 | 7/2001 |
| JP | 2011-58551 | 3/2011 |
| JP | 2012-189200 | 10/2012 |
| JP | 2013-142421 | 7/2013 |
| WO | 2010/090139 | 8/2010 |

* cited by examiner

CHAIN TRANSMISSION DEVICE FOR DRIVING CAMSHAFTS

TECHNICAL FIELD

The present invention relates to a chain transmission device for driving camshafts of an internal combustion engine.

BACKGROUND ART

In a chain transmission device for driving camshafts, the device including a crank sprocket attached to a crankshaft, cam sprockets attached to the respective camshafts, and a timing chain (hereinafter, simply referred to as "chain") having a loose side chain portion and being trained around the crank sprocket and the cam sprockets. A pivotable chain guide extending along the direction in which the chain moves is provided on one side of the loose side chain portion, and an adjustment force is applied to an end portion of the chain guide by a chain tensioner such that the chain becomes tensioned, thereby preventing the chain from becoming loose or flapping.

Also, a fixed chain guide is mounted to the tension side chain portion of the chain with both end portions of the fixed chain guide supported by respective supporting members. The fixed chain guide guides the movement of the chain, while preventing the chain from flapping.

As the chain guide for adjusting the tension of the chain or the chain guide for guiding the movement of the chain, a sliding-type chain guide is known which guides a chain by its convex circular-arc shaped guide surface. However, since such a sliding-type chain guide guides a chain by coming into sliding contact with the chain, there is the problem that the resistance to the movement of the chain is large so that the transmission loss of torque is large.

In order to overcome such a problem, the applicant of the present application has proposed, in PCT International Publication No. 2010/090139, a chain guide including a guide base made of synthetic resin, and elongated in the direction in which a chain moves, a plurality of roller shafts arranged so as to draw a curved line, and each having both end portions supported by the guide base, and rollers comprising roller bearings. The rollers are rotatably supported by the respective roller shafts, and the rollers movably guide the chain.

Since the rollers roll to guide the chain in the above chain guide, the resistance to the movement of the chain is small so that the transmission loss of torque is small.

In the chain guide of the above-noted PCT International Publication No. 2010/090139, the chain linearly moves between adjacent rollers, but moves while curving at the positions of the chain coming into contact with the respective rollers so as to collide against the outer peripheries of the rollers. Therefore, large noise or vibration is likely to occur compared to a conventional chain guide slidably guiding a chain by its circular-arc shaped guide surface. Therefore, it is necessary to reduce such noise or vibration.

In a chain transmission device for driving camshafts, the device includes a crank sprocket, a chain, and rollers. When the torque of the crank sprocket changes due to the explosion of an engine, the tension of the chain changes largely. At this time, the roller located closest to the crank sprocket is likely to be affected by the flapping of the chain, so that noise is likely to occur especially at this roller.

In order to learn the relationship between a noise and the winding angles α of the portions of a chain C located on the outer peripheries of rollers R comprising roller bearings and guiding the chain C by rolling as illustrated in FIG. 4, by varying the above winding angles α, the inventors of the present application performed an experiment on the noise generated when the chain C moves at a constant speed. As a result of this experiment, the inventors obtained the experimental result illustrated in FIG. 5. From the graph of FIG. 5, it turned out that a sound pressure value decreases by setting the winding angles α of the chain C to be large, but does not decrease any further if the winding angles α exceed 170 degrees.

The inventors performed a further experiment so as to measure noise under the condition that the winding angle α of the portion of the chain C located on the outer periphery of the roller R located closest to a crank sprocket is 170 degrees, and discovered that it is possible to markedly reduce noise under this condition.

The winding angle of the chain C means the intersecting angle of the common tangent of one adjacent pair of any three rollers R arranged successively in the direction in which the chain C moves, and the common tangent of the other adjacent pair of the three rollers R (see FIG. 4), or the intersecting angle of the common tangent of the crank sprocket and the roller R adjacent to the crank sprocket on its chain exit side and the common tangent of this roller R and the roller R adjacent to this roller R (see FIG. 2).

In a chain transmission device for driving camshafts in which a plurality of guide rollers provided in a chain guide guides a chain by rolling, it is an object of the present invention to reduce the noise generated when the chain moves.

SUMMARY OF THE INVENTION

In order to achieve the above object, the present invention provides a chain transmission device for driving a camshaft, the device comprising: a crank sprocket mounted to a crankshaft; a cam sprocket mounted to the camshaft; a chain including a loose side chain portion and trained around the crank sprocket and the cam sprocket. A chain guide is mounted on the outer side of the loose side chain portion so as to be pivotable about one of the two end portions of the chain guide, and the chain guide is provided with a plurality of rotatable rollers. An adjustment force is applied to the other of the two end portions of the chain guide by a chain tensioner such that the chain guide is biased toward the chain, so that the rollers of the chain guide can guide the chain by rolling. One of the rollers is located closest to the crank sprocket, and the winding angle of the portion of the chain located on the outer peripheral portion of said one of the rollers is set to be 170 degrees or over.

As described above, the winding angle of the chain means the intersecting angle of the common tangent of the crank sprocket and the roller adjacent to the crank sprocket and the common tangent of the roller adjacent to the crank sprocket and the roller adjacent to this roller.

By setting the winding angle of the portion of the chain located on the outer periphery of the roller which is located closest to the crank sprocket and which is likely to be affected by the flapping of the chain to be 170 degrees or over, it is possible to reduce noise.

By setting the winding angles of the portions of the chain located on the respective outer peripheries of the others of the rollers to be 170 degrees or over, the chain is guided or moved substantially linearly by rolling the rollers, thus making it possible to further reduce noise.

In the rotation transmission device, the chain further comprises a tension side chain portion. The rotation transmission device further comprises a fixed chain guide mounted on the outer side of the tension side chain portion, and including a plurality of rotatable rollers capable of guiding the movement of the tension side chain portion. By setting the winding angles of the portions of the chain located on the respective outer peripheries of the rollers of the fixed chain guide to be 170 degrees or over, it is possible to prevent the chain from flapping, and thus to very effectively reduce noise.

Effects of the Invention

As described above, in the present invention, since the winding angle of the portion of the chain located on the outer periphery of the roller located closest to the crank sprocket is set to be 170 degrees or over, it is possible to reduce noise.

DETAILED DESCRIPTION OF THE INVENTION

Figure 1:
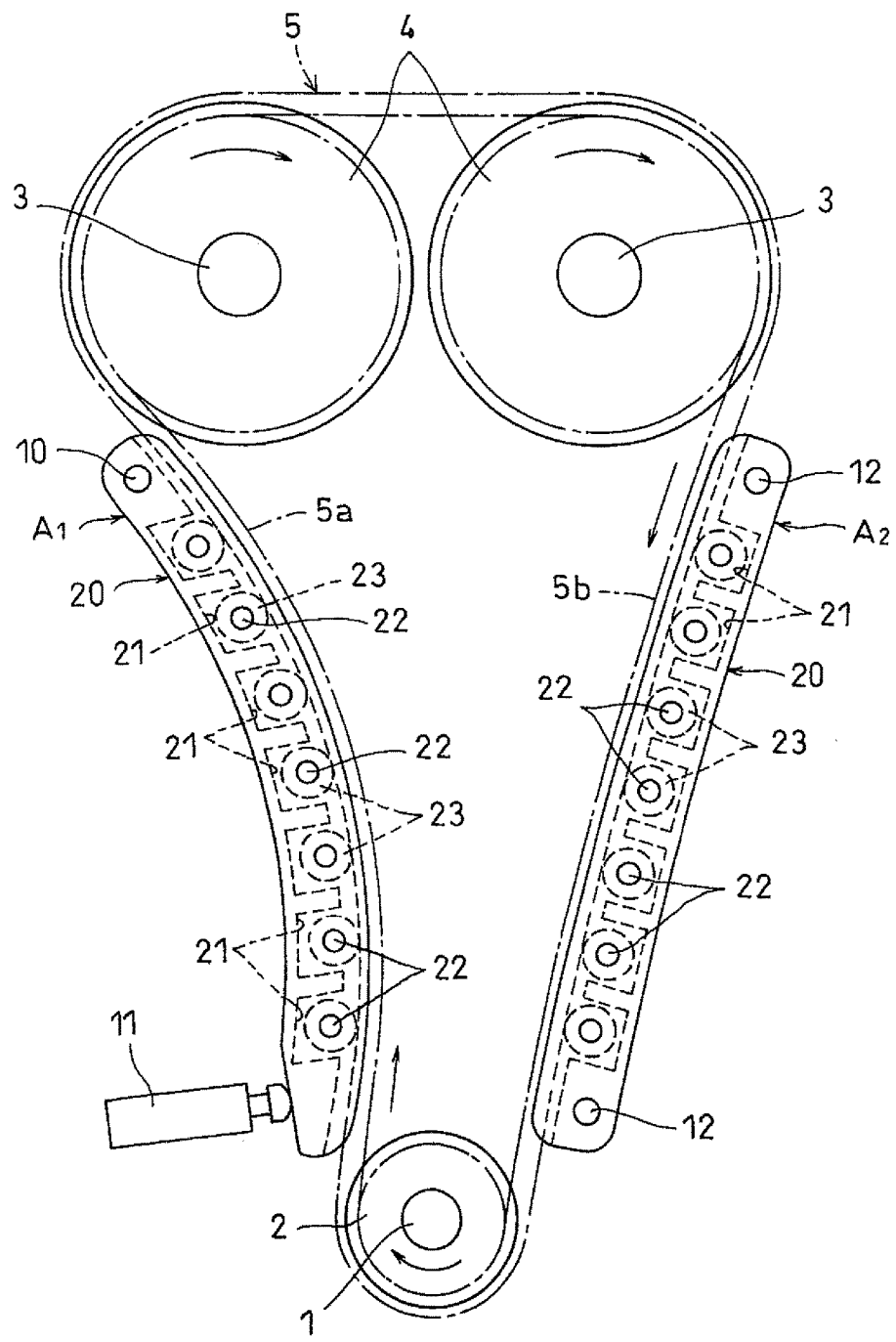
FIG. 1 is a schematic diagram of a chain transmission device for driving camshafts according to an embodiment of the present invention.

The chain transmission device for driving camshafts according to the embodiment of the present invention will now be described with reference to FIGS. 1 to 3. As illustrated in FIG. 1, this chain transmission device includes a crank sprocket 2 attached to an end portion of a crankshaft 1, cam sprockets 4 attached to end portions of respective camshafts 3, and a timing chain 5 trained around the crank sprocket 2 and the cam sprockets 4. With this arrangement, the rotation of the crankshaft 1 is transmitted to the camshafts 3 so as to rotate the camshafts 3.

As the timing chain 5, a roller chain or a silent chain is used.

The crankshaft 1 rotates in the direction indicated by the arrow in FIG. 1. Due to the rotation of the crankshaft 1, the timing chain 5 (hereinafter, simply referred to as "chain") moves in the direction indicated by the arrows in FIG. 1. At this time, the portion of the chain 5 moving upwardly becomes loose, and the portion of the chain 5 moving downwardly becomes tensioned. These portions are therefore called "loose side chain portion 5a" and "tension side chain portion 5b", respectively. A tension-adjusting chain guide $A_1$ for adjusting the tension of the chain 5 is provided on one side of the loose side chain portion 5a. A movement-guiding chain guide $A_2$ for guiding the movement of the chain 5 is provided on the other side of the tension side chain portion 5b.

Figure 2:
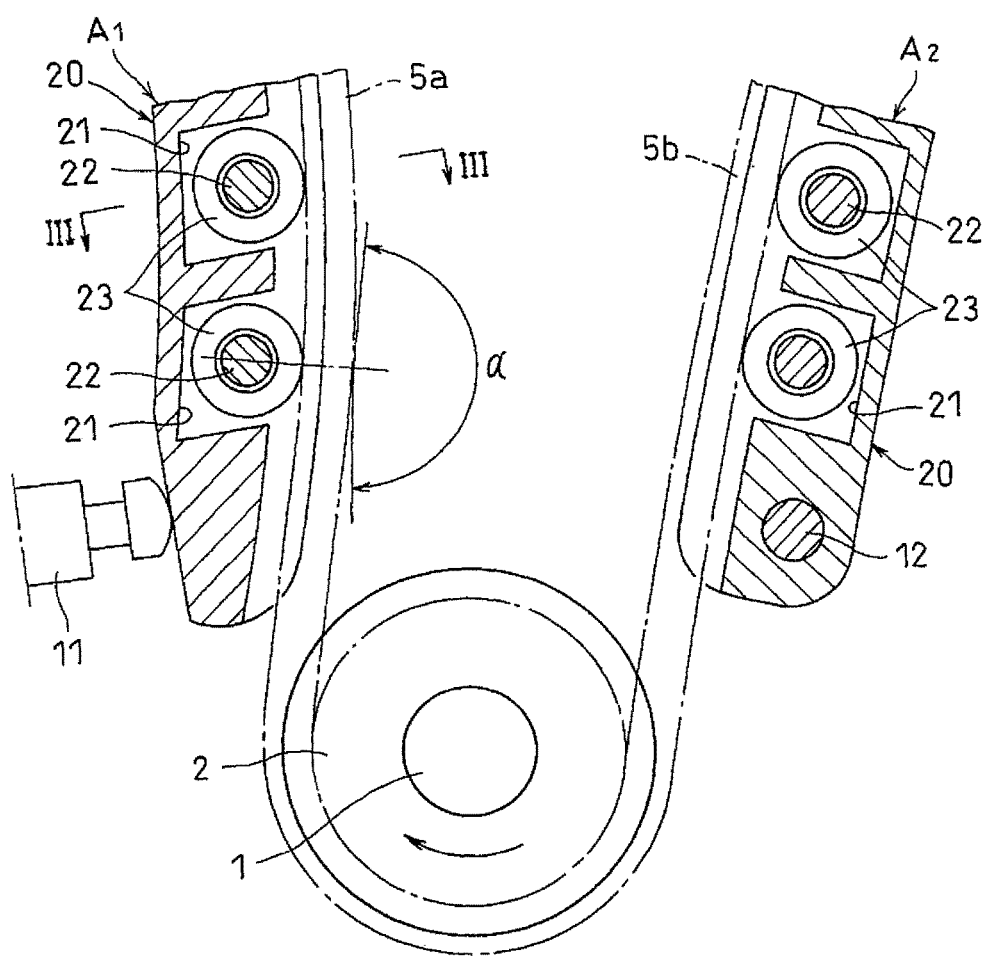
FIG. 2 is an enlarged sectional view illustrating the vicinity of the crank sprocket of FIG. 1.
Figure 3:
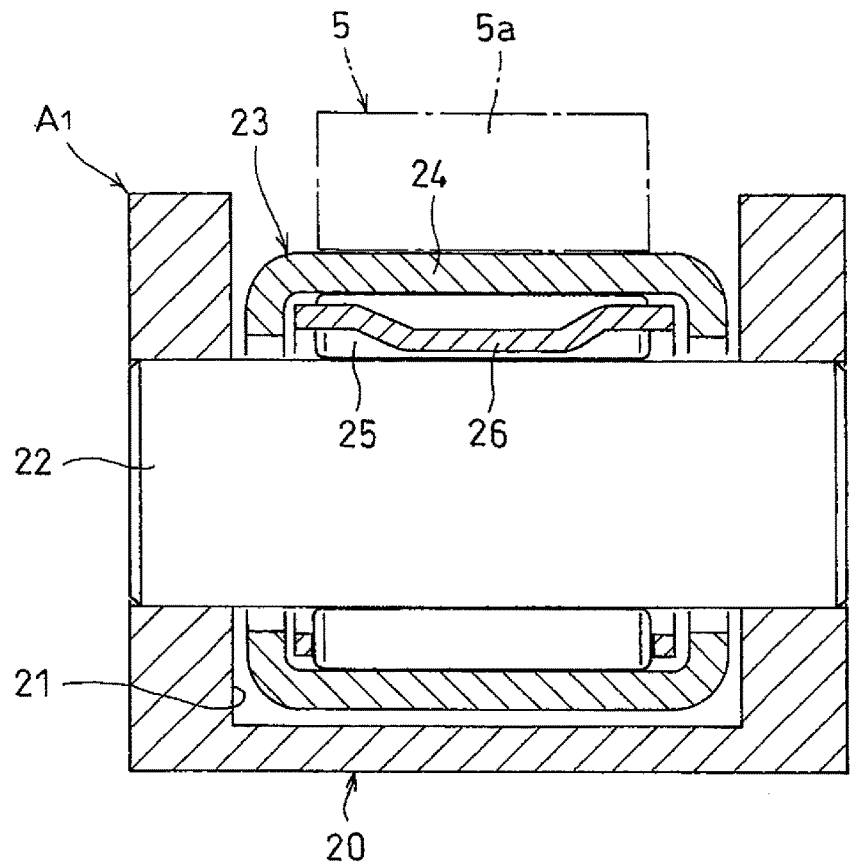
FIG. 3 is a sectional view taken along line III-III of FIG. 2.
Figure 4:
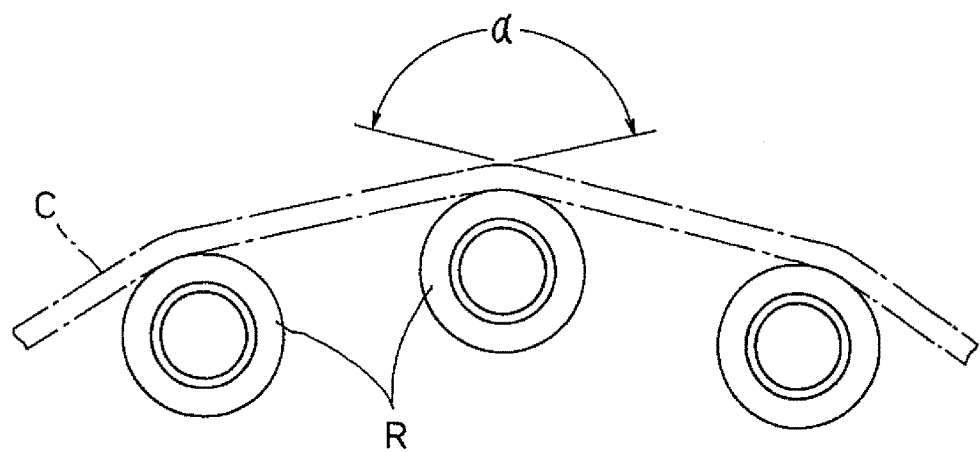
FIG. 4 is a view illustrating the winding angle of the portions of a chain located on the respective outer peripheries of rollers.
Figure 5:
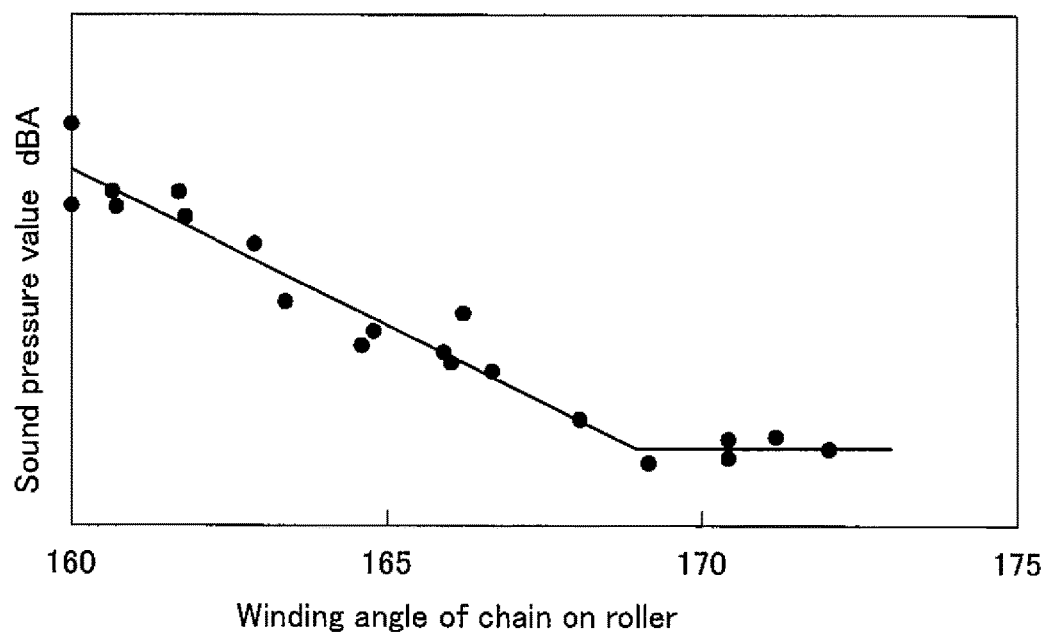
FIG. 5 is a graph of an experimental result showing the relationship between a noise and the winding angle of the chain.

As illustrated in FIGS. 1 to 3, the tension-adjusting chain guide $A_1$ includes a curved guide base 20 having opposed side plates, and elongated in the direction in which the chain 5 moves. A plurality of roller receiving recesses 21 are formed in the convex curved surface of the guide base 20, namely, its surface opposed to the chain 5 so as to be spaced apart from each other in the longitudinal direction of the guide base 20. The tension-adjusting chain guide $A_1$ further includes roller shafts 22 each having both ends supported by the respective opposed side plates of the guide base 20, between which side plates the roller receiving recesses 21 are formed, and rollers 23 rotatably supported by the respective roller shafts 22.

The guide base 20 is made of a synthetic resin having sufficient oil resistance, weather resistance, and strength, such as polyamide 46 (PA46) or polyamide 66 (PA66).

The roller shafts 23 are made of SUJ2 or SC material. Heat treatment is performed to the roller shafts 23 so as to increase their hardness, thereby increasing their wear resistance. As such heat treatment, though bright quenching is used in this embodiment, high frequency quenching, carburizing and quenching, or carbonitriding may be used.

The rollers 23 are roller bearings each including a shell-type outer race 24 formed by drawing a metal plate such as SPC or SCM, a plurality of roller elements 25 mounted inside of the outer race 24, and a retainer 26 retaining the roller elements 25.

With the tension-adjusting chain guide $A_1$ arranged along the direction in which the loose side chain portion 5a moves, the upper end portion of the guide base 20 is supported by a fulcrum shaft 10 protruding from an engine block such that the chain guide $A_1$ is pivotable about the fulcrum shaft 10, and an adjustment force is applied to the lower end portion of the chain guide $A_1$ remote from the fulcrum shaft 10 by a chain tensioner 11 such that the chain guide $A_1$ is biased toward the loose side chain portion 5a. Therefore the chain guide $A_1$ can guide the loose side chain portion 5a by rolling the rollers 23 kept in contact with the loose side chain portion 5a.

The movement-guiding chain guide $A_2$ is substantially identical in structure to the tension-adjusting chain guide $A_1$, but differs from the chain guide $A_1$ only in that a guide base of the chain guide $A_2$ has a shape different from that of the guide base 20 of the chain guide $A_1$. Therefore, as for the elements of the chain guide $A_2$ corresponding to those of the chain guide $A_1$, the same reference numerals used in the chain guide $A_1$ are used, and their description is omitted.

With the movement-guiding chain guide $A_2$ arranged along the direction in which the tension side chain portion 5b moves, the upper and lower end portions of the chain guide $A_2$ are fixed in position by the fastening of respective bolts 12 screwed into the engine block, so that the chain guide $A_2$ can guide the movement of the chain 5 by its rollers 23.

The chain 5, guided by the rollers 23 of the tension-adjusting chain guide $A_1$ and the rollers 23 of the movement-guiding chain guide $A_2$, linearly moves between the adjacent rollers 23 of the chain guides $A_1$ and $A_2$, but moves while curving at the positions of the chain 5 coming into contact with the respective rollers 23 so as to collide against the outer peripheries of the rollers 23, thereby generating noise. In order to reduce such noise, the winding angles α illustrated in FIG. 2 of the portions of the chain 5 located on the respective outer peripheries of all of the rollers 23 are set to be 170 degrees or over in this embodiment.

By setting the winding angle α of the portions of the chain 5 located on the respective outer peripheries of all of the rollers 23 to be 170 degrees or greater as described above, since the chain 5 moves substantially linearly, the force of the chain 5 colliding against the respective outer peripheries of the rollers 23 is weakened, thus making it possible to reduce noise.

By setting the winding angle α to be large, specifically, 170 degrees or greater, the loads applied to the respective rollers 23 from the chain 5 are made small, so that the chain 5 and the outer races 24 are less likely to wear.

When the torque of the crank sprocket 2 changes due to the explosion of the engine, the tension of the chain 5 changes, so that the chain 5 flaps. At this time, the roller 23 of the chain guide $A_1$ located closest to the crank sprocket 2 is likely to be affected by the flapping of the chain 5, so that noise is likely to occur especially at this roller 23.

Therefore, by setting only the winding angle α of the portion of the chain 5 located on the outer periphery of the roller 23 of the chain guide $A_1$ located closest to the crank sprocket 2 to be 170 degrees or over, too, it is possible to very effectively reduce noise.

DESCRIPTION OF REFERENCE NUMERALS $A_1$: chain guide
$A_2$: chain guide
2: crank sprocket
4: cam sprocket
5: timing chain (chain)
11: chain tensioner
23: roller (roller bearing)

The invention claimed is:

1. A chain transmission device for driving a camshaft, the device comprising:
    a crank sprocket to be mounted to a crankshaft;
    a cam sprocket to be mounted to the camshaft;
    a chain including a loose side chain portion, the chain being trained around the crank sprocket and the cam sprocket; and
    a chain guide mounted on an outer side of the loose side chain portion so as to be pivotable about one of two end portions of the chain guide, the chain guide having a plurality of rotatable rollers,
    wherein the chain guide is configured such that when an adjustment force is applied to the other of the two end portions of the chain guide by a chain tensioner such that the chain guide is biased toward the chain, the rollers of the chain guide can guide the chain by rolling, and
    wherein one of the rollers is located closest to the crank sprocket, and a winding angle of a portion of the chain located on an outer periphery of the one of the rollers is set to be 170 degrees or greater.

2. The chain transmission device according to claim 1, wherein winding angles of portions of the chain located on respective outer peripheries of the others of the rollers are set to be 170 degrees or greater.

3. The chain transmission device according to claim 1, wherein the chain further comprises a tension side chain portion,
    wherein the chain transmission device further comprises a fixed chain guide mounted on an outer side of the tension side chain portion, the fixed chain guide including a plurality of rotatable rollers configured to guide a movement of the tension side chain portion, and
    wherein winding angles of portions of the chain located on respective outer peripheries of the rollers of the fixed chain guide are set to be 170 degrees or greater.

4. The chain transmission device according to claim 2, wherein the chain further comprises a tension side chain portion,
    wherein the chain transmission device further comprises a fixed chain guide mounted on an outer side of the tension side chain portion, the fixed chain guide including a plurality of rotatable rollers configured to guide a movement of the tension side chain portion, and
    wherein winding angles of portions of the chain located on respective outer peripheries of the rollers of the fixed chain guide are set to be 170 degrees or greater.

* * * * *